Figure 1:
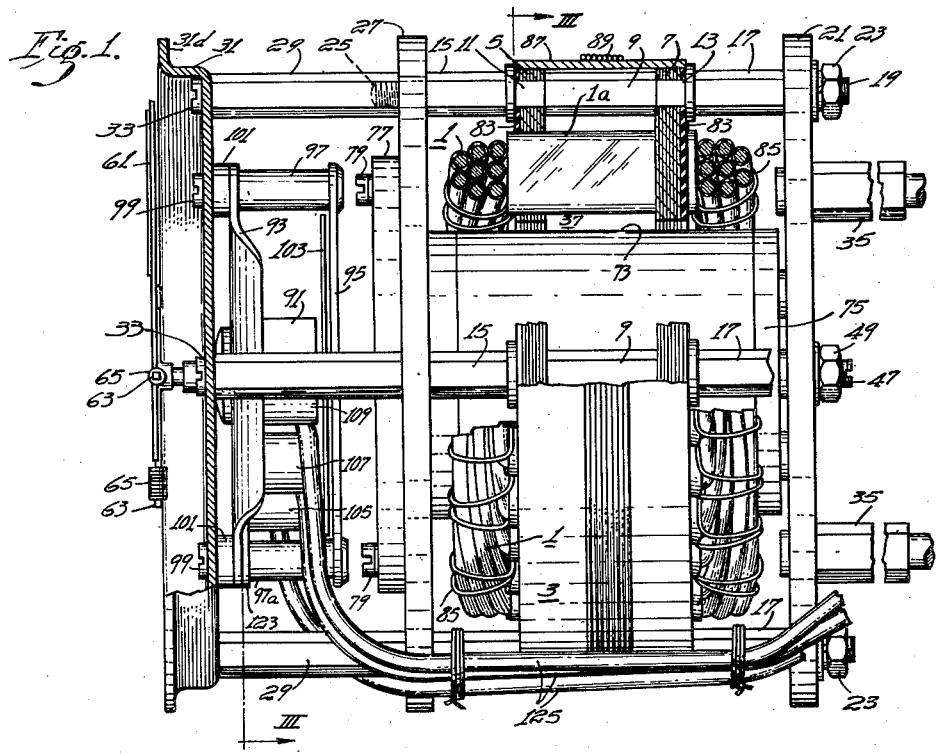

Nov. 21, 1950  D. A. YOUNG ET AL  2,531,018
ELECTRICAL PHASE MEASURING INSTRUMENT
Filed Dec. 8, 1943  2 Sheets-Sheet 1

WITNESSES:

INVENTORS
Bernard E. Lenehan, Douglass A. Young &
Howard F. Bush.
BY
ATTORNEY

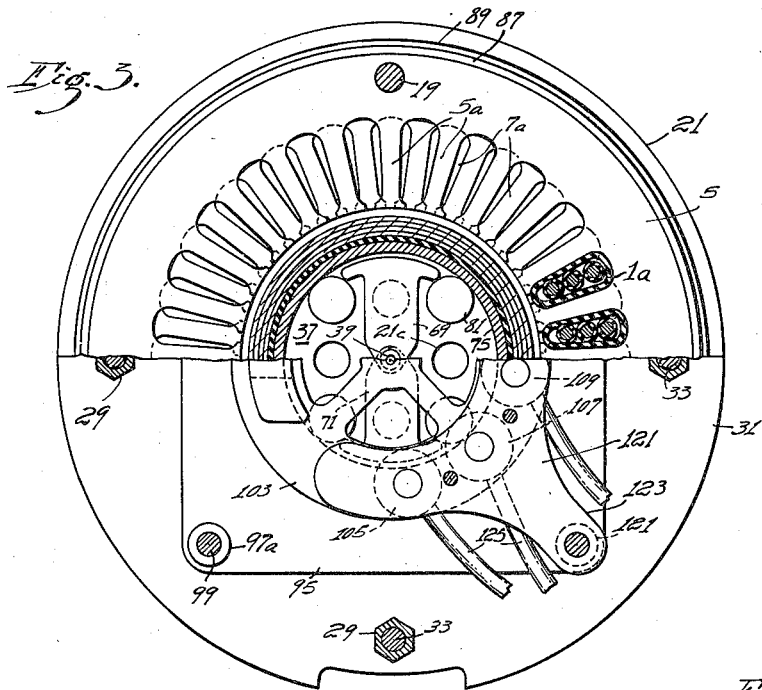

Patented Nov. 21, 1950

2,531,018

UNITED STATES PATENT OFFICE 2,531,018

ELECTRICAL PHASE MEASURING INSTRUMENT

Douglass A. Young, East Orange, Bernard E. Lenehan, Bloomfield, and Howard F. Bush, Florham Park, N. J., assignors to Westinghouse Electric Corporation, East Pittsburgh, Pa., a corporation of Pennsylvania Application December 8, 1943, Serial No. 513,350

11 Claims. (Cl. 172—245)

This invention relates to instruments responsive to the phase relationship between electrical quantities and it has particular relation to synchroscopes and power factor measuring instruments.

In one form of an instrument responsive to the phase relationship between two alternating-current quantities, a polyphase winding is provided for producing a rotating magnetic field. A magnetic rotor assembly is disposed in this magnetic field. In addition, a single-phase winding is provided for directing magnetic flux through the magnetic rotor assembly. An instrument of this type is described in electrical measuring instruments by C. V. Drysdale and A. C. Jolley, published in 1924 by the D. Van Nostrand Co., New York city, volume 2, pages 244 and 245, under the heading "Westinghouse Rotating Iron Single-Phase Power Factor Indicator." On page 372, the authors refer to the same instrument for application as a synchroscope. This instrument is desirable for the reason that it has no moving winding and for the further reason that the rotor assembly readily may be arranged for continuous rotation. However, prior art constructions have been objectionable for the reason that the stator and rotor assembly are so interlaced that inspection and maintenance are rendered difficult. Furthermore, prior art constructions have been subject to creeping and jerky operation.

In accordance with the invention an instrument of the foregoing type is provided with a stator assembly having an opening sufficient to permit ready removal of the rotor assembly from operative position within the stator assembly. In addition, openings are provided which permit the air gap within which the rotor assembly rotates to be inspected after the rotor assembly has been mounted in the stator assembly. To eliminate creepage of the rotor assembly, an auxiliary motor is provided which applies a compensating torque to the rotor assembly in a direction tending to oppose the torque producing creepage. The auxiliary motor and the polyphase winding producing the rotating magnetic field for the rotor assembly preferably are energized from the same source of energy.

In order to obtain smooth rotation of the rotor assembly, the polyphase winding associated therewith is provided with a magnetic core divided into two parts. These parts are spaced axially with respect to the axis of rotation of the rotor assembly and are displaced with respect to each other angularly about the axis. This construction tends to position maximum torque points for one of the magnetic parts of the core between maximum torque points for the other magnetic part of the core and results in appreciably smoother operation of the rotor assembly.

It is, therefore, an object of the invention to provide an improved instrument responsive to the phase relationship between a pair of electrical quantities.

It is a further object of the invention to provide an instrument responsive to the phase relationship between a pair of electrical quantities wherein the parts of the instrument may be readily assembled and disassembled.

It is an additional object of the invention to provide an instrument responsive to the phase relationship between electrical quantities wherein creepage of the instrument is substantially eliminated.

It is a still further object of the invention to provide an instrument responsive to the phase relationship between a pair of electrical quantities wherein jerky operation of the instrument is substantially eliminated.

Figure 2:
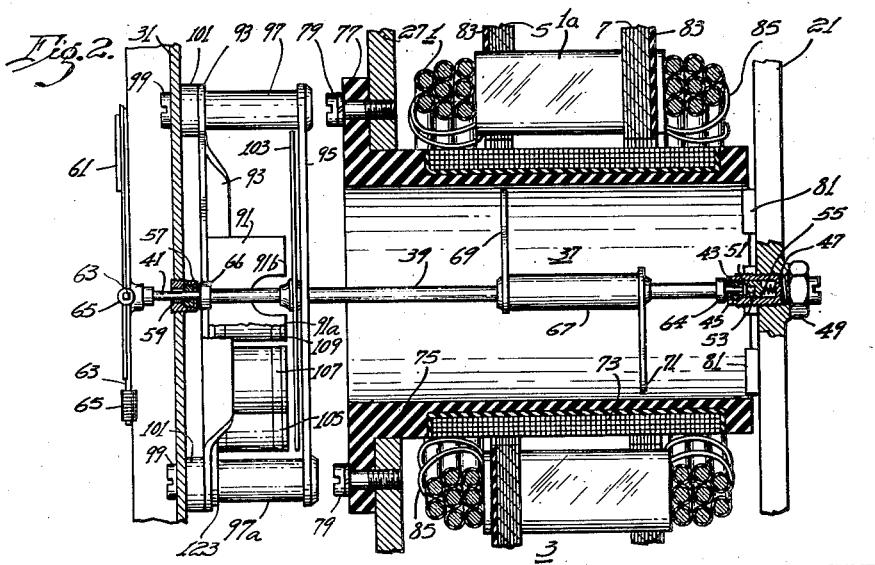

Other objects of the invention will be apparent from the following description taken in conjunction with the accompanying drawings, in which:

Figure 1 is a view in side elevation with parts broken away of an instrument embodying the invention, Fig. 2 is a view in side elevation with parts broken away and parts in section of the instrument shown in Fig. 1, Fig. 3 is a sectional view taken along the line III—III of Fig. 1 with a portion of the windings omitted, Fig. 4 is a detail view in side elevation with parts in section of an auxiliary motor unit suitable for the instrument of Fig. 1, Fig. 5 is a detail view in side elevation of a portion of a polyphase winding and associated magnetic core suitable for the instrument of Fig. 1, Fig. 6 is an exploded view in perspective showing the relationship of parts employed in the instrument of Fig. 1, Fig. 7 is a schematic view showing circuit connections suitable for the instrument of Fig. 1.

Referring to the drawings, Fig. 1 shows an instrument responsive to the phase relationship between a pair of electrical quantities. This instrument may, for example, be employed either as a synchroscope or as a power factor meter. The principal distinctions between these two applications of the instrument reside in the extent of the pointer rotation of the instrument and the type of scale associated with the pointer.

These distinctions are well understood in the art as shown, for example, by the aforesaid book by Drysdale and Jolley. The instrument of Fig. 1 includes a polyphase winding 1 having associated therewith a magnetic core 3. The magnetic core includes two magnetic parts or rings 5 and 7 which are spaced apart by means of spacers 9. Each of the spacers 9 has a stud 11 or 13 projecting from each of its ends. Nuts 15 and 17 are in threaded engagement with the studs 11 and 13 for the purpose of securing the rings 5 and 7 securely to the spacer 9. The nuts 17 also act as spacers and have studs 19 projecting therefrom through a base plate 21. Nuts 23 and suitable lock washers cooperate with the studs 19 to secure the magnetic core 3 to the base plate 21.

The nuts 15 have studs 25 which project through openings in a plate 27 into threaded engagement with nuts 29. The nuts 29 support a bridge plate 31 which is secured to the nuts by means of suitable machine screws 33. The plates 21, 27 and 31 serve to support the various parts of the instrument. If desired, columns 35 may project from the base plate 21 for the purpose of securing the instrument within a suitable casing (not shown).

The polyphase winding 1 and its magnetic core 3 form part of a stator assembly for actuating a rotor assembly 37 which is shown more clearly in Fig. 2. The rotor assembly 37 includes a shaft 39 having bearing pins 41 and 43 projecting from its ends. The bearing pin 43 passes through a ring jewel bearing 45 carried by a bearing screw 47. The bearing screw 47 is in threaded engagement with the base plate 21 and has a lock nut 49 associated therewith. The end of the bearing pin 43 engages an end stone jewel 51 which conveniently may be mounted in a plunger 53. The plunger 53 is positioned in a cavity provided in the bearing screw 47 and is urged against the ring jewel 45 by means of a spring 55.

The bearing pin 41 extends through a ring jewel bearing 57 which is mounted in a bearing screw 59. The bearing screw 59 is in threaded engagement with the bridge plate 31. The pointer 61 is secured to the end of the bearing pin 41 for rotation with the rotor assembly 37. In addition, suitable balance arms 63 may project in different directions from the end of the bearing pin 41 and may have adjustable bearing weights 65 associated therewith for bringing the rotor assembly accurately into balance. Collars 64 and 66 are positioned on said shaft respectively adjacent the bearing screws 47 and 59. These collars permit a limited axial movement of the shaft with respect to the stator assembly. However, if the instrument is subjected to shock one of the collars engages its associated bearing screw before the rotor assembly can move sufficiently to damage a bearing pin or jewel.

The rotor assembly 37 additionally comprises a magnetic sleeve 67 which is secured to the shaft 39. This sleeve extends axially along said shaft for a substantial distance, as shown in Fig. 2. At its ends the sleeve 67 has secured thereto a pair of magnetic vanes 69 and 71 which project radially from the shaft 39 in opposite directions. The magnetic sleeve 67 and the magnetic vanes 69 and 71 preferably are formed of a soft magnetic material having low losses, such as that disclosed in the Yensen Patent 1,807,021.

Magnetic flux is directed through the rotor assembly by means of a single-phase winding 73 which surrounds the rotor assembly, and which may be termed a "polarizing" winding. This winding is formed on a sleeve 75 having at one end a circular flange 77 which is attached to the plate 27 by means of suitable machine screws 79. The sleeve 75 and the flange 77 may be molded from a suitable insulating material such as a phenolic resin. As shown in Fig. 2, the winding 73, if desired, may be disposed in a recess in the sleeve 75. The lower end of the sleeve 75 may be positioned with respect to the base plate 21 by means of protuberances 81 attached to the base plate. The protuberances 81 are positioned to engage the inner surface of the sleeve 75 at spaced intervals around the screw 47. Consequently, these protuberances serve to position the lower end of the sleeve 75 accurately with respect to the screw 47.

In previous constructions the magnetic core for the polyphase winding 1 was formed of a single group of magnetic laminations. Such a core is objectionable for the reason that the concentration of magnetic flux adjacent the teeth formed in the magnetic core produces a jerky movement of the rotor assembly. According to the invention the magnetic core 3 is divided into the two magnetic parts or rings 5 and 7. Although these rings may be of solid material, preferably each is formed of a plurality of magnetic laminations of a soft magnetic iron. The surfaces of the magnetic core 3 which are adjacent the end turns of the winding 1 may be provided with a layer 83 of insulating material similar in outline to the outline of the laminations. The rings 5 and 7 are spaced apart in a direction parallel to the shaft 39. This permits the elongation of the sleeve 67 and a more effective polarization of the magnetic parts of the rotor assembly.

As shown more clearly in Fig. 3, the magnetic ring 5 has a plurality of uniformly spaced teeth 5a projecting interiorly of the magnetic ring. Similarly, the magnetic ring 7 is provided with a plurality of uniformly spaced teeth 7a. The winding 1 has its turns disposed in the slots between the teeth 5a and 7a. Sheet insulation 1a is wrapped around each of the turns of the winding 1. As previously explained, the winding 1 is a polyphase winding intended to produce a rotating magnetic field. Although a two-phase winding may be employed, somewhat better results have been obtained from a three-phase winding and it is assumed for the purpose of discussion that a three-phase winding is employed in the instrument discussed herein. Since the design of such a winding is well understood in the art and is similar to the three-phase windings commonly employed for alternating-current motors, a detailed discussion of the design thereof is unnecessary for an understanding of the invention. It will be observed that the end turns of the winding 1 are spaced from the shaft 39 sufficiently to permit ready insertion and removal of the sleeve 75 therethrough. The end turns are securely tied together by means of cord 85. By inspection of Fig. 3, it will be observed that although the rings 5 and 7 are substantially similar in construction, the teeth 7a are displaced with reference to the teeth 5a angularly about the shaft 39 by an angular distance approximately equal to ½ the angular pitch or distance about the shaft between centerlines of successive teeth on one of the rings. This displacement results in substantially smoother operation of the instrument. It will be understood that the displacement of the rings with respect to each other results in an inclined relation of the conductors of the winding 1 relative to the shaft 39, as shown clearly in Fig. 5.

The magnetic core 3 is completed by a strip or band 87 of soft magnetic material which encircles the rings 5 and 7 and which is secured in place by a number of turns of banding wire 89. These turns conveniently may be soldered to each other at intervals around the periphery of the magnetic core 3. The band 87 completes a magnetic path which comprises in series the magnetic vane 69, the magnetic ring 5, the band 87, the magnetic ring 7, the magnetic vane 71 and the magnetic sleeve 67.

In order to damp rotation of the rotor assembly 37, a damping assembly is provided which includes a U-shaped permanent magnet 91 having pole faces 91a and 91b. The permanent magnet 91 is secured to a plate 93 and the pole faces 91a and 91b are spaced from a plate 95 formed of soft magnetic material to form an air gap therebetween. The plates 93 and 95 are secured to each other by means of suitable struts 97, and the entire damping structure is secured to the bridge plate 31 by means of suitable machine screws 99 which are threadedly received in spacers 101 secured to the plate 93. A disk armature 103 of suitable electroconductive material, such as aluminum, is secured to the shaft 39 and is positioned for rotation in the air gap between the plate 95 and the pole faces of the permanent magnet 91. As well understood in the art, the armature 103 cooperates with the permanent magnet 91 to damp rotation of the rotor assembly.

When the three-phase winding 1 is energized and the single-phase winding 73 is deenergized, a rotating magnetic field is present in the air gap containing the rotor assembly 37. Under these conditions, the rotor assembly 37 acts somewhat as the rotor of an induction motor and tends to creep or rotate slowly. Such creepage is objectionable in instruments of the type herein discussed.

In order to eliminate creepage, an auxiliary motor is employed which applies to the rotor assembly a torque opposing the torque which tends to produce creepage. This auxiliary motor may be a three-phase motor having poles 105, 107 and 109 positioned adjacent the disk armature 103. The construction of these poles is shown clearly in Figs. 3 and 4. Each of the poles includes a spool 111 formed of insulating material, such as a phenolic resin, having a winding 113 wound thereon. The spool 111 has a cylindrical axial opening therethrough for receiving a magnetic core 115 which may be constructed of a soft magnetic iron. This magnetic core has a head 117 engaging one end of the spool 111 and has a portion 119 of reduced diameter which is passed through an opening 121 in a plate 123 of soft magnetic iron. The portion 119 after passage through the opening 121 is upset to rivet the core 115 securely to the plate 123. The terminals of the various coils are connected through suitable conductors 125 to a suitable source of electrical energy. As more clearly shown in Figs. 2 and 3, the plate 123 has substantially a Y-shape and is secured between the plate 93 and a strut 97a which also is formed of a soft magnetic iron. Consequently, when the coils of the poles 105, 107 and 109 are suitably energized from a three-phase source of energy, a shifting magnetic field is set up in the air gap containing the disk armature 103. This shifting magnetic field applies a torque to the disk armature which is proportioned to oppose and substantially compensate for the creepage torque resulting from energization of the winding 1.

Suitable connections for the various windings are illustrated in Fig. 7. Let it be assumed that the instrument is to be employed as a synchroscope to facilitate the synchronization of two alternating-current generators 131 and 133. The phase windings of the winding 1 are illustrated in Fig. 6 as phase windings 1a, 1b and 1c. In an analogous manner, the coils 113 of the auxiliary motor are represented in Fig. 7 by phase windings 113a, 113b and 113c. It will be observed that each of the phase windings 1a, 1b and 1c is connected in series with a separate winding of the auxiliary motor for energization from the generator 131 through a suitable phase splitter 135. This phase splitter 135 may be of any suitable design for converting the single-phase output of the generator 131 into a three-phase output. The specific phase splitter illustrated includes a transformer 137 having its primary connected in series with a resistor 139 across the terminals of the generator 131. The connections of the windings to the phase splitter may be traced readily on Fig. 7. The phase splitter is similar to that described in the Oman Patent 2,253,392, issued August 19, 1941. It will be noted further that the single-phase winding 73 is connected across the generator 133 for energization therefrom.

Since the windings 1 and 73 are not interlaced with the rotor assembly, it is possible to inspect the air gap in which the rotor assembly rotates after the rotor assembly has been mounted in its bearings. Such inspection is facilitated by the provision of suitable openings in the plates 21, 31, 93 and 95 and in the disk armature 103. Such openings are illustrated in Fig. 6. The bridge plate 31 has openings 31c therein. The disk armature 103 has four openings 103c therethrough. The plates 93 and 95 have, respectively, openings 93c and 95c therethrough. It will be observed further that the openings 93c and 95c have channels 93d and 95d extending from the openings to the other edge of the plates. This makes it possible to withdraw the damping magnet assembly as a unit with the permanent magnet 91 and the poles 105, 107 and 109 mounted therein from the rotor assembly in a direction transverse to the shaft 39. During such removal the shaft passes through the channels 93d and 95d. Openings 21c also are provided in the base plate 21 to facilitate inspection of the air gap for the rotor assembly.

Referring to Figs. 1 and 6, it will be observed that the bridge plate 31 has a raised rim 31d positioned adjacent the path of travel of the tip of the pointer 61. This rim may have scale markings applied thereto. The specific scale markings employed depend on the application of the instrument. If the instrument is employed as a power factor meter, the scale is designed to indicate the various power factors which the instrument may indicate. Alternatively if the instrument is employed as a synchroscope, a single reference point 31e may be applied to the rim 31d. The arrangement of the scale is well understood in the art.

It is believed that the operation of the instrument is apparent from the foregoing description.

If the instrument is to be employed as a synchroscope, the winding 1 is connected to one of the sources of alternating-current such as the generator 131 of Fig. 7. The single-phase winding 73 then is connected to the second source of alternating current represented by the generator 133 in Fig. 7. Energization of the winding 1 produces a rotating field which may tend of itself to rotate the rotor assembly 37. However, since the auxiliary motor poles 105, 107 and 109 are connected in series with the phase windings of the winding 1, the auxiliary motor applies to the rotor assembly a torque which opposes and compensates for the creepage torque. Moreover, since the auxiliary motor and the winding 1 are connected to the same source of energy any variation in the energization of the winding 1 is accompanied by a corresponding variation in the energization of the auxiliary motor. Consequently, the creepage and compensating torques remain balanced despite a substantial variation in the voltage output of the generator 131.

When the single-phase winding 73 is energized, it directs magnetic flux through the magnetic vanes 69 and 71 and the sleeve 67. This magnetic flux cooperates with the rotating magnetic field produced by the winding 1 to rotate the pointer 61 in accordance with the phase relationship of the outputs of generators 131 and 133. The operation of the instrument as a power factor meter is substantially similar, it being understood that the windings 1 and 73 are energized in accordance with the voltage and a current of a circuit, the power factor of which is to be indicated. When so energized the pointer 61 takes a position corresponding to the phase displacement between the current and voltage, and this displacement, or the power factor, may be indicated on a suitable scale associated with the pointer.

The accessibility of the instrument may be understood by reference to Fig. 2. If it is desired to disassemble the instrument, the machine screws 99 may be removed and the entire damping magnet assembly may be removed as a unit in a direction transverse to the shaft 39. During such removal, the shaft passes through the channels 93d and 95d (Fig. 6). If it is desired to remove the bridge plate 31, the pointer 61 may be removed from the bearing pin 41 and the screws 33 may be removed to permit removal of the bridge plate 31 from the rotor assembly. Next, the entire rotor assembly 37 may be removed in a direction parallel to the shaft 39. By removing the screws 79, the single-phase winding 73 may be removed through the opening in the plate 27. By following the reverse procedure the instrument readily may be assembled.

Although the invention has been described with reference to certain specific embodiments thereof, numerous modifications are possible. Therefore, the invention is to be restricted only by the appended claims as defined in view of the prior art.

We claim as our invention:

1. In an electrical instrument responsive to the phase relationship between first and second electrical quantities, a stator assembly including a polyphase winding structure effective when energized for producing a rotating magnetic field, a rotor assembly, and means mounting said rotor assembly in said magnetic field for rotation about an axis relative to said stator assembly, said rotor assembly comprising a pair of magnetic vanes spaced apart along said axis and extending radially from said axis in substantially opposite directions, said stator assembly including a pair of magnetic parts having slots for receiving said polyphase winding structure, said polyphase winding structure being common to both of said parts, said parts surrounding said rotor assembly and being spaced along said axis to position each of said parts adjacent a separate one of said magnetic vanes, and said magnetic parts and said magnetic vanes being so located that when one of said vanes is substantially aligned with a slot in its associated magnetic part the other one of the vanes is displaced angularly about said axis with respect to the nearest slot thereto.

2. In an electrical instrument responsive to the phase relationship between first and second electrical quantities, a stator assembly including a polyphase winding structure effective when energized for producing a rotating magnetic field, a rotor assembly, and means mounting said rotor assembly in said magnetic field for rotation about an axis relative to said stator assembly, said rotor assembly comprising a pair of magnetic vanes spaced apart along said axis and extending radially from said axis in substantially opposite directions, said stator assembly including a pair of magnetic rings each having radial internal teeth uniformly spaced thereabout, said polyphase winding structure being positioned in the slots between said teeth and being common to both of said magnetic rings, said magnetic rings surrounding said rotor assembly and being spaced along said axis to position each of said rings adjacent a separate one of said magnetic vanes, said magnetic rings being displaced angularly about said axis with respect to each other, said displacement having an angular distance less than the angular pitch of successive teeth on one of said rings about said axis.

3. In an electrical instrument responsive to the phase relationship between first and second electrical quantities, a stator assembly including a polyphase winding structure effective when energized for producing a rotating magnetic field, a rotor assembly, and means mounting said rotor assembly in said magnetic field for rotation about an axis relative to said stator assembly, said rotor assembly comprising a pair of magnetic vanes spaced apart along said axis and extending radially from said axis in substantially opposite directions, and a magnetic structure extending along said axis between said magnetic vanes for conducting magnetic flux between said magnetic vanes, said stator assembly including a single-phase winding structure surrounding said rotor assembly, said single-phase winding structure being effective when energized for directing magnetic flux through said vanes and said magnetic structure, a pair of magnetic rings each having radial internal teeth uniformly spaced thereabout, said polyphase winding structure being positioned in the slots between said teeth and being common to both of said magnetic rings, said magnetic rings surrounding said rotor assembly and being spaced along said axis to position each of said rings adjacent a separate one of said magnetic vanes, said magnetic rings being displaced angularly about said axis with respect to each other, said displacement having an angular distance less than the angular pitch of successive teeth on one of said rings about said axis, and a magnetic member extending between said magnetic rings for defining a magnetic path including in series a first one of said magnetic rings, a first one of said magnetic vanes, said magnetic structure, a second one of said magnetic vanes, a second one of said magnetic rings and said magnetic member.

4. In an electrical measuring instrument, a stator assembly, a rotor assembly, means mounting said rotor assembly for rotation with respect to said stator assembly, said assemblies, when energized, producing relative rotation therebetween in accordance with the energization thereof, and said assemblies being subject to a torque producing undesired relative rotation therebetween, and means for compensating said torque, said means comprising an auxiliary motor associated with said assemblies, said auxiliary motor, when energized, being proportioned to produce a torque acting between said assemblies in opposition to, and substantially compensating said first-named torque.

5. In an electrical instrument, a stator assembly; a rotor assembly, means mounting said rotor assembly for rotation relative to said stator assembly, means including a first motor winding for producing, when energized, a rotation of said rotor assembly relative to said stator assembly, said first motor winding when energized being effective for producing an undesired torque acting between said assemblies and varying in magnitude in accordance with the energization of said winding, means including a second motor winding for producing, when energized, a compensating torque acting between said assemblies in opposition to said first-named torque, and means connecting said windings for energization from the same source of energy.

6. In an electrical instrument responsive to the phase relationship between first and second electrical quantities, a stator assembly including a polyphase winding structure effective when energized for producing a rotating magnetic field, a magnetic rotor assembly, means mounting said rotor assembly in said magnetic field for rotation about an axis relative to said stator assembly, said stator assembly including a single-phase winding structure effective when energized for directing magnetic flux through said rotor assembly, whereby said magnetic flux and said magnetic field cooperate to rotate said rotor assembly in accordance with the phase relationship between the electrical quantities energizing said winding structures, said rotor assembly having a tendency to creep when said polyphase winding structure alone is energized, means including an auxiliary polyphase winding structure for producing a torque acting on said rotor assembly, said torque being directed and proportioned to compensate for said tendency to creep, and means connecting said polyphase winding structures for energization from a common source of energy.

7. In an electrical instrument, a stator assembly, a rotor assembly, means mounting said rotor assembly for rotation about an axis with respect to said stator assembly, said rotor assembly including a main armature and an auxiliary armature, said stator assembly including windings cooperating with said main armature, when suitably energized, to produce relative rotation between said assemblies, said rotor assembly being removable from its operative position relative to said stator assembly in the direction of said axis, damping means cooperating with said auxiliary armature to damp relative movement between said assemblies, auxiliary winding means cooperating with said auxiliary armature, when energized, to apply a torque between said assemblies, means mounting said damping means and said auxiliary winding means as a unit on said stator assembly, said unit being configured for removal from operative position relative to said rotor assembly in a direction substantially transverse to said axis.

8. In an electrical instrument responsive to the phase relationship between first and second electrical quantities; an instrument movement comprising a stator assembly including a polyphase winding structure effective when energized for producing a rotating magnetic field, a rotor assembly, and means mounting said rotor assembly in said magnetic field for rotation about the axis relative to said stator assembly, said rotor assembly comprising a pair of magnetic vanes spaced apart along said axis and extending radially from said axis in substantially opposite directions, and a magnetic structure extending along said axis between said magnetic vanes for conducting magnetic flux between said vanes, said stator assembly including a single-phase winding structure surrounding said rotor assembly, said single-phase winding structure being effective when energized for directing magnetic flux through said vanes and said magnetic structure, whereby the magnetic flux and said magnetic field cooperate to rotate said rotor assembly in accordance with the phase relationship between the electrical quantities energizing said winding structures, said single-phase winding structure having an opening therethrough sufficient in size to permit passage of said rotor assembly along said axis from an operative position substantially within said last-named structure to a position external thereto, and said instrument movement having openings cooperating with said first-named opening to permit visual inspection, while the rotor assembly is in operative mounted condition relative to said stator assembly, of the gap within which said rotor assembly rotates, said stator assembly including a pair of magnetic rings having radial, internal teeth, said rings surrounding said rotor assembly and being spaced along said axis to position each ring adjacent a separate one of said magnetic vanes, said polyphase winding structure being positioned in the slots between said teeth, and said rings being displaced angularly about said axis with respect to each other, a magnetic member for establishing a magnetic path between said rings externally of the winding structure in said slots, an electroconductive disk armature mounted on said rotor assembly, a damping magnet cooperating with said armature for damping relative rotation between said assemblies, means including an auxiliary polyphase winding cooperating with said armature, when energized, for applying a torque to said rotor assembly which is opposed to the torque applied to said rotor assembly by energization of said polyphase winding structure alone, and means connecting said auxiliary polyphase winding and said polyphase winding structure for energization from a common source of energy.

9. In an electrical instrument responsive to the phase relationship between first and second electrical quantities, a stator assembly including a polyphase winding effective when energized for producing a rotating magnetic field, a rotor assembly, and means mounting said rotor assembly for rotation about an axis relative to said stator assembly, said rotor assembly comprising a magnetic member having a pair of magnetic vanes spaced along said axis, said stator assembly including a single-phase winding effective when energized for directing magnetic flux through said vanes, and a pair of magnetic rings associated with said polyphase windings for directing magnetic flux passing through said magnetic vanes, said magnetic rings being separated along said axis by a non-magnetic space to position each of said rings adjacent a separate one of said magnetic vanes.

10. In an electrical instrument, a stator assembly, a rotor assembly, means mounting said rotor assembly for rotation about an axis with respect to said stator assembly, said rotor assembly including a main armature and an auxiliary armature, said stator assembly including windings cooperating with said main armature, when suitably energized, to produce relative rotation between said assemblies, said stator assembly operating under certain conditions of energization thereof to produce an undesired torque acting between said assemblies, said rotor assembly being removable from its operative position relative to said stator assembly in the direction of said axis, damping means cooperating with said auxiliary armature to damp relative movement between said assemblies, auxiliary winding means cooperating with said auxiliary armature, when energized, to apply a torque between said assemblies acting in opposition to said undesired torque and proportioned substantially to compensate the instrument for errors introduced by the undesired torque, means mounting said damping means and said auxiliary winding means as a unit on said stator assembly, said unit being configured for removal from operative position relative to said rotor assembly in a direction substantially transverse to said axis.

11. In an electrical instrument responsive to the phase relationship between first and second electrical quantities, a stator unit including a magnetic structure having an opening therethrough and a polyphase winding cooperating with the magnetic structure when energized for establishing a shifting magnetic field in the opening, a magnetic rotor assembly, means mounting the magnetic rotor assembly in the opening for rotation about an axis passing through the opening relative to the stator unit, said rotor assembly comprising a pair of magnetic vanes spaced apart axially along the axis of rotation of the rotor assembly and the magnetic structure including a pair of magnetic rings spaced to position a separate one of the magnetic rings adjacent each of the magnetic vanes, and a single-phase winding surrounding the rotor assembly and positioned between the rotor assembly and the stator unit, said single-phase winding being effective when energized for directing magnetic flux through the rotor assembly, said single-phase winding having an opening proportioned to permit withdrawal of the rotor assembly as a unit in an axial direction therethrough from an operative position relative to the single-phase winding and the stator unit.

DOUGLASS A. YOUNG.
BERNARD E. LENEHAN.
HOWARD F. BUSH.

REFERENCES CITED

The following references are of record in the file of this patent:

UNITED STATES PATENTS

| Number | Name | Date |
| --- | --- | --- |
| 1,266,604 | MacGahan | May 21, 1918 |
| 1,604,693 | Hecht | Oct. 26, 1926 |
| 2,183,685 | Lingg | Dec. 19, 1939 |
| 2,188,785 | Hall | Jan. 30, 1940 |
| 2,333,991 | Faus | Nov. 9, 1943 |
| 2,339,021 | Lingel | Jan. 11, 1944 |
| 2,345,936 | Jewell | Apr. 4, 1944 |